UNITED STATES PATENT OFFICE.

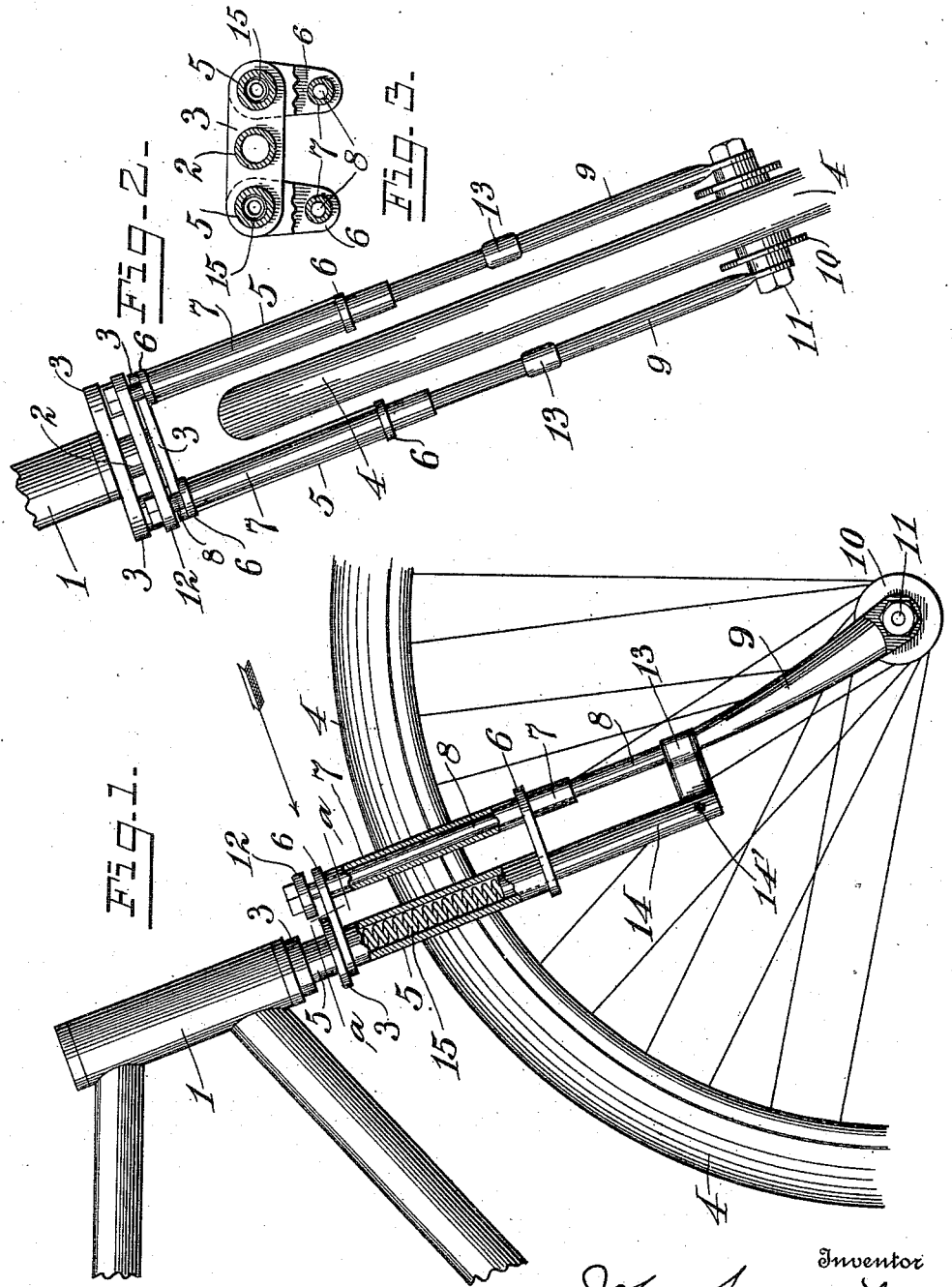

JOHN SCHMIDT, OF DAYTON, OHIO.

BICYCLE-FORK.

973,219.  Specification of Letters Patent.  Patented Oct. 18, 1910.

Application filed May 23, 1910. Serial No. 562,804.

*To all whom it may concern:*

Be it known that I, JOHN SCHMIDT, a subject of the Emperor of Austria-Hungary, residing at Dayton, in the county of Montgomery and State of Ohio, have invented certain new and useful Improvements in Bicycle-Forks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in cushion bicycle forks to relieve the bicycle of jars or undue strain and to equalize such undue strain when the bicycle frame is called upon to meet it.

The object of the invention is to provide a bicycle attachment of the above type which may be readily applied to any of the well known forms of bicycles now in use, and which is adapted to receive the strain due to thrusts and to equalize the same. In other words, any undue strain which may be imposed upon the bicycle due to striking obstructions or turning, will be met and uniformly distributed throughout the frame work of the machine.

In the accompanying drawings Figure 1 is a side elevation of a portion of a bicycle frame and front wheel, with parts in section. Fig. 2 is a front elevation looking in the direction of the arrow in Fig. 1, and Fig. 3 is a sectional view on the line *a—a* of Fig. 1.

In the drawings and specification, similar reference characters indicate similar parts.

1 designates the head of the bicycle frame in which oscillates the stem 2 in the usual manner. Mounted rigidly on the lower end of the stem 2 are crown plates 3 suitably spaced. Projecting downwardly from these crown plates in a straight line on each side of the wheel 4, are tubular members 5. The tubes 5 and the plates 3 are rigid with the stem 2. Projecting forwardly from said tubes 5 are brackets 6 which support tubular guides 7. Adapted to reciprocate within the guide tubes 7 are plungers 8 8 which lie on oppositet sides of the wheel and form the upper ends of the fork 9. The ends of the plungers 8 are braced to the upper ends of the forks 9. The forks 9 are attached to the hub 10 at 11 in the usual manner. The upper ends of the plungers 8 are connected by a cross plate 12 which prevents the wheel from rocking sidewise in the forks 9 when turning.

It will be seen from the above description, in connection with the drawings, that the wheel 4, the forks 9 and the plungers 8 have a free and independent movement relative to the tubular members 5 and 7, the crown plates 3 and the head 1. This free movement is controlled to secure a cushion effect as follows: Projecting rigidly and rearwardly from the lower portions of the plungers 8 are brackets 13. These brackets are secured to the lower ends of plungers 14 by screws 14'. The said screws pass through openings in said plungers 14 which are slightly larger than the screws and said screws engage the brackets 13. It is desirable that the plungers 14 shall have some slight independent movement. The plungers 14 project into the tubular members 5 a suitable distance where they engage helical springs 16 which are mounted within said tubular members. It will be seen that when the weight of the rider on the bicycle is thrown on the head 1, the tubular members 5 and 7 will slide upon the plungers 14 and 8 and the springs 15 will be compressed and absorb or take up the shock. It will thus be seen that the framework of the machine will be relieved of all undue strain. If the wheel 4 should strike an obstruction, the same cushion effect is produced by the yielding or compression of the spring. The plungers 8 serve to equalize or distribute all strain incidental to turning or striking an obstruction, on both sides of the wheel, while the springs 15 provide a cushion effect.

I claim:

The combination with the head, stem and crown-piece of a bicycle, of tubular members 5 secured to said crown-piece below the head and lying on opposite sides of the front wheel of the bicycle, springs 15 within said tubular member and adapted to receive the strain from the frame of the bicycle in direct lines from the head, tubular guides 7 in front of and parallel with said tubular members 5, brackets 6 securing said tubular members and tubular guides rigidly, a fork 9 inclosing the front wheel of the bicycle and having extensions 8 passing through the tubular guides 7, a tie-plate 12 secured to the upper end of said extensions 8, brackets 13 secured to the fork 9 below the extensions 8, and plungers 14 loosely connected to the brackets 13 and extending into the tubular members 5 and engaging the springs therein, substantially as and for the purposes specified.

In testimony whereof I affix my signature, in presence of two witnesses.

JOHN SCHMIDT.

Witnesses:
    R. J. McCarty,
    Matthew Siebler.